United States Patent
Hoffner et al.

(10) Patent No.: US 11,128,587 B2
(45) Date of Patent: Sep. 21, 2021

(54) ENTERPRISE MESSAGING USING A VIRTUAL MESSAGE BROKER

(71) Applicant: SAP SE, Walldorf (DE)

(72) Inventors: Andreas Hoffner, Waghäusel (DE); Martin Bachmann, Heidelberg (DE); Oliver Liemert, Heppenheim (DE)

(73) Assignee: SAP SE, Walldorf (DE)

( * ) Notice: Subject to any disclaimer, the term of this patent is extended or adjusted under 35 U.S.C. 154(b) by 2 days.

(21) Appl. No.: 16/410,739

(22) Filed: May 13, 2019

(65) Prior Publication Data

US 2020/0366631 A1    Nov. 19, 2020

(51) Int. Cl.
H04L 12/58      (2006.01)
G06F 3/0482    (2013.01)

(52) U.S. Cl.
CPC ............ H04L 51/12 (2013.01); G06F 3/0482 (2013.01)

(58) Field of Classification Search
CPC ......... H04L 51/12; H04L 67/16; H04L 67/02; H04L 67/26; G06F 3/0482
See application file for complete search history.

(56) References Cited

U.S. PATENT DOCUMENTS

| | | |
|---|---|---|
| 9,146,802 B2 | 9/2015 | Tran et al. |
| 9,367,595 B1* | 6/2016 | Malks .................. G06F 16/258 |
| 10,157,068 B2 | 12/2018 | Arians et al. |
| 10,210,225 B2 | 2/2019 | Hoffner et al. |
| 2005/0015619 A1 | 1/2005 | Lee |
| 2005/0021622 A1 | 1/2005 | Cullen |
| 2008/0126980 A1 | 5/2008 | Bachmann et al. |
| 2016/0080334 A1* | 3/2016 | Hamilton ............ H04L 63/0428 713/168 |
| 2016/0248871 A1* | 8/2016 | Seed .................... H04L 67/2809 |
| 2017/0300402 A1 | 10/2017 | Hoffner et al. |
| 2017/0329479 A1 | 11/2017 | Rauschenbach et al. |
| 2017/0329505 A1 | 11/2017 | Richter et al. |

(Continued)

FOREIGN PATENT DOCUMENTS

WO    2016134267    8/2016

OTHER PUBLICATIONS

Extended European Search Report issued in European Application No. 19209420.9 dated May 15, 2020, 9 pages.

(Continued)

*Primary Examiner* — Caroline H Jahnige

(74) *Attorney, Agent, or Firm* — Fish & Richardson P.C.

(57) ABSTRACT

The present disclosure involves systems, software, and computer implemented methods for performing enterprise messaging with a virtual message broker. One example method includes operations to receive, at an enterprise messaging (EM) layer associated with a shared message bus, a request associated with a first client to subscribe to a second client, wherein the EM layer provides an abstraction to the shared message bus, and wherein the shared message bus is shared between the first client and the second client. A rule set associated with the first client is identified, where the rule set is defined in a service descriptor associated with an EM service interface bound to the first client. In response to determining that the requested subscription to the second client is allowed by the identified rule set, the subscription is created, and events corresponding to the subscription are provided to the first client for consumption.

20 Claims, 10 Drawing Sheets

(56) References Cited

U.S. PATENT DOCUMENTS

| | | |
|---|---|---|
| 2018/0034760 A1 | 2/2018 | Hoffner et al. |
| 2018/0060087 A1 | 3/2018 | Waechter et al. |
| 2018/0102996 A1 | 4/2018 | Bachmann et al. |
| 2018/0102997 A1 | 4/2018 | Bachmann et al. |
| 2018/0129694 A1 | 5/2018 | Hoffner et al. |
| 2018/0167476 A1 | 6/2018 | Hoffner et al. |
| 2019/0132276 A1 | 5/2019 | Scheiber et al. |

OTHER PUBLICATIONS

Wikipedia.com [online], "Message Queue," Wikipedia reference, last modified May 9, 2019, [retrieved on May 10, 2019], retrieved from: URL<https://en.wikipedia.org/wiki/Message_queue>, 5 pages.
U.S. Appl. No. 15/860,035, Pfeifer et al., "Transport Channel via Web Socket for Odata," filed Jan. 2, 2018, 30 pages.

* cited by examiner

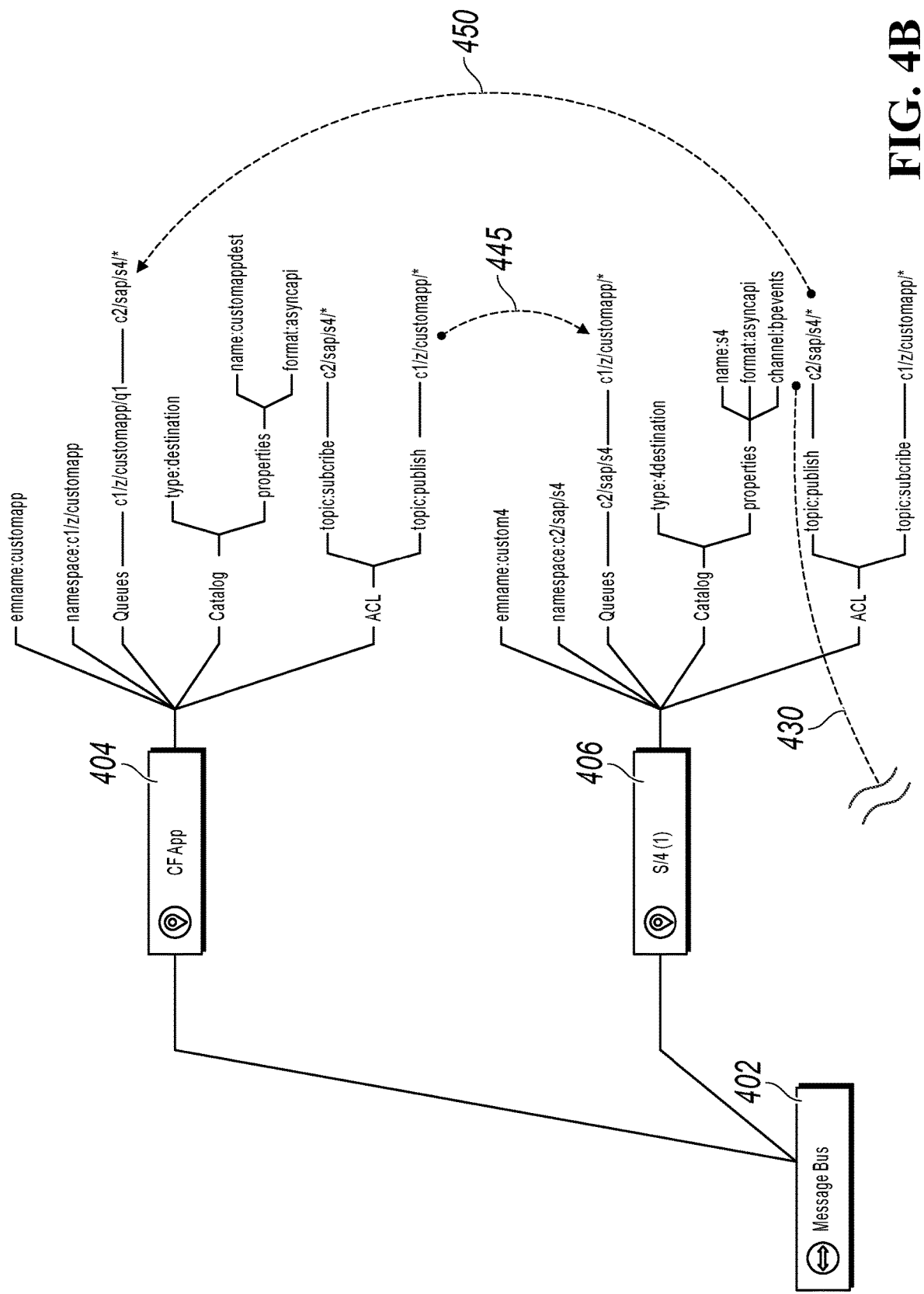

ENTERPRISE MESSAGING USING A VIRTUAL MESSAGE BROKER

TECHNICAL FIELD

The present disclosure relates to computer-implemented methods, software, and systems for performing enterprise messaging with a virtual message broker.

BACKGROUND

Messaging is an established technology that helps to decouple information technology (IT) systems, and can be a core building-block of high volume cloud-based architectures. Messaging systems can be used to improve resilience, high availability, and handling high volumes of messages and other communications. For example, message queues can be used for inter-process communication and/or inter-component communication in various systems.

As messaging can provide the foundation for many scenarios, a high number of queues, senders, and receivers may be in use in particular implementations. As such, providing solutions can become complex for administrators or developers to implement and be provided an overview on which message-sender is connected to which message-queue and to which message-receiver. Example systems, for instance, may have numbers of connected endpoints increasing into the thousands and hundreds of thousands in the future.

SUMMARY

The present disclosure involves systems, software, and computer-implemented methods for performing enterprise messaging with a virtual message broker. One example method includes receiving, at an enterprise messaging layer associated with a shared message bus, a request associated with a first messaging client to subscribe to a second messaging client, wherein the enterprise messaging layer provides an abstraction to the shared message bus, and wherein the shared message bus is shared between the first messaging client and the second messaging client. A rules set associated with the first messaging client is identified, where the identified rule set is defined in a service descriptor associated with an enterprise messaging service interface bound to the first messaging client. In response to determining that the requested subscription to the second messaging client is allowed by the identified rule set, the requested subscription is created from the first messaging client to the second messaging client via the enterprise messaging layer. In response to an event corresponding to the created subscription being generated by the second messaging client, the generated event is provided to the first messaging client for consumption.

Implementations can optionally include one or more of the following features. In some instances, the rule set associated with the first messaging client is defined at onboarding of the first messaging client to the enterprise messaging layer, and wherein the rule set defines at least one of the following: whether the first messaging client is allowed to subscribe to topics associated with other messaging clients of the enterprise messaging layer, a number of connections allowed to be created for the first messaging client to other messaging clients of the enterprise messaging layer, or defining a number of queues for receiving messages or events from the other messaging clients of the enterprise messaging layer. In some of those instances, the rule set of the first messaging client is customized after onboarding of the first messaging client.

In some instances, in response to determining that the requested subscription to the second messaging client is not allowed by the identified rule set, the method may comprise rejecting the requested subscription to the second messaging client.

In some instances, the first messaging client and the second messaging client, when onboarded to the enterprise messaging layer, are associated with a respective unique namespace, unique human-readable name, a rule set for the messaging client, and a catalog defining a set of messages or events published by the messaging client. In some of those instances, after onboarding to the enterprise messaging layer, a visualization of the first messaging client and the second messaging client to the shared message bus is generated. In those instances, the method may further comprise presenting the generated visualization of the first messaging client and the second messaging client to a user interface, where the received request for the first messaging client to subscribe to a second messaging client is received via user interface interactions between the visualized first messaging client and the second messaging client as received via the presented visualization. The generated visualization may include at least a third messaging client previously onboarded to the enterprise messaging layer.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
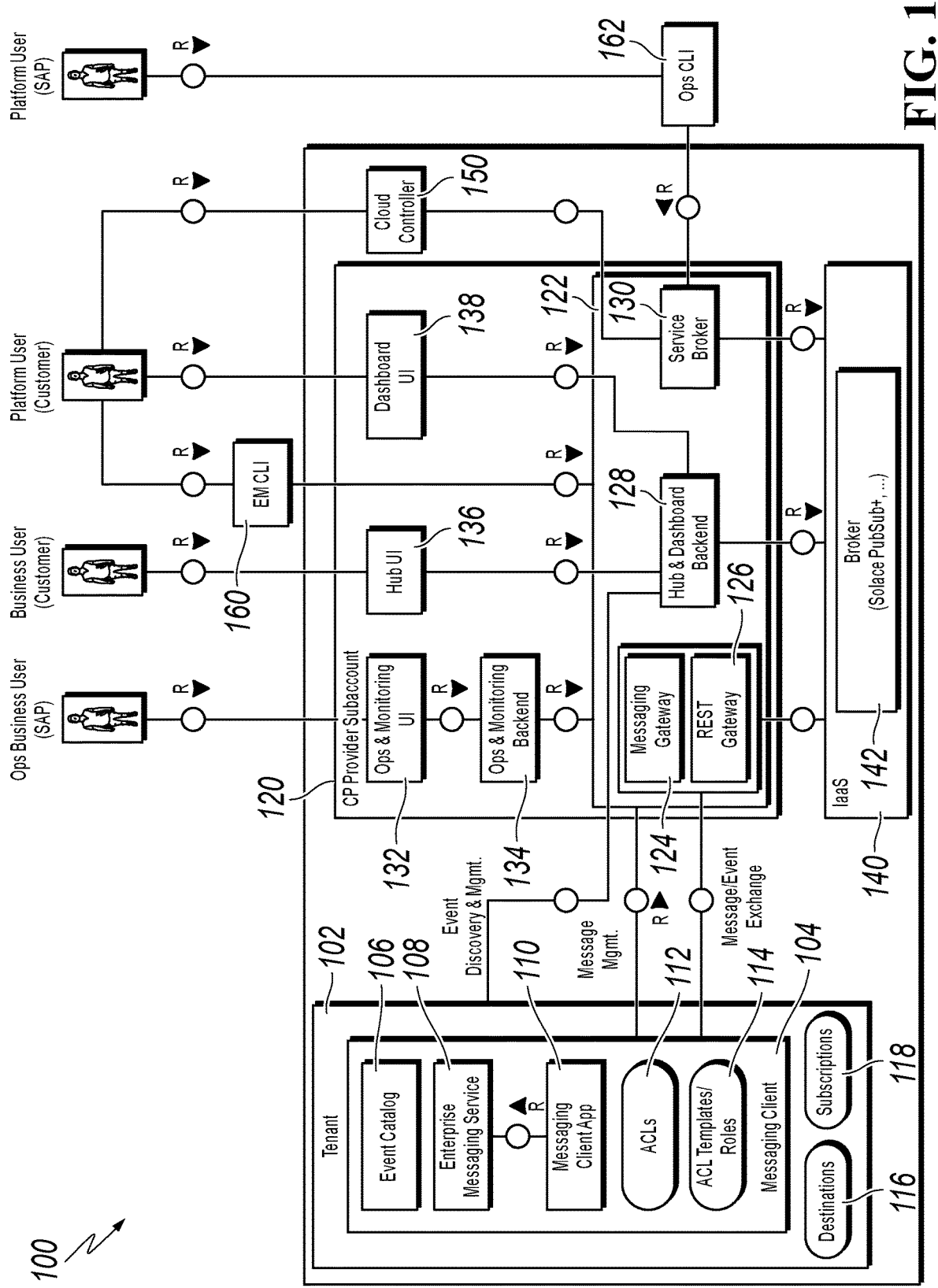
FIG. 1 is an example component overview associated with tenant-related artifacts and components and an enterprise message provider.

The present solution provides tools, systems, and software for providing a centralized messaging component that can be used by different tenants, or clients, without the need for a client-specific messaging component to be used. In the described solution, each client may be represented as or associated with a service instance. Instead of each service instance being directly bound to a corresponding message broker resource, the solution performs operations to detect whether a service instance of a particular client is already associated with a corresponding message broker in a tenant-specific context. Each of the messaging participants are tenant-related, which can include the subscriptions to particular topics and information, which are themselves based on service instances of particular participants. If so, the existing message broker is associated with the centralized messaging through an onboarding process, and communications with other components can be made via the centralized messaging system.

At a technical level, information about message-sources, message-transporting, and message-receivers can be made available to a centralized messaging, or message broker, system. By storing such information at a centralized location, the centralized system can provide information to prospective messaging participants, make available information about particular clients or other messaging participants as to what and where messages may be sent, and, further, can govern messaging and attempted connections and actions based on a set of client-specific rules and restrictions. In some instances, a detailed visualization may be made available, such that user interface (UI)-based interactions can be used to connect different messaging endpoints and to understand the rules, requirements, and restrictions of particular clients.

In order to manage such a messaging system, a plurality of components may be employed, or components of different types may be used. Examples of one implementation may include, for example, a virtual message broker or message bus, and two or more messaging clients. The message bus can provide the basic messaging capabilities for the system, and can be the basis for message exchange based on pub/sub messaging. The message bus can connect messaging clients to each other in a loosely coupled manner. In some instances, a standard messaging broker can be used for this purpose, with an abstracted view to consumers without the technical details of the broker itself. The virtual broker may be the same as, or can encompass the message bus, and can provide a level of isolation to the system. The messaging clients can connect to the message bus and exchange messages with one another. In prior systems, each messaging client may have used similar credentials and rights, and could generically connect to the message bus for interacting with other components. In the present solution, however, each messaging client is associated with a unique namespace (e.g., a technical name), a unique human-readable name, a set of messaging client-associated access rules ("ACLs"), and event metadata associated with that particular client. The unique namespace can be used to ensure that any topics or queues associated with the particular messaging client are unique, and avoids name clashes throughout all inter-system and intra-system interactions. The ACLs can be specific to the particular messaging client, and can, among other rules, define a number of allowed subscriptions to be created for that messaging client, describe a number of queues which can be created for the client, and can restrict or manage any other messaging options for that specific client. In some instances, particular rules may initially be applied to particular messaging clients, and can be customized at runtime or at a later design-time interaction to modify the allowed operations of the particular messaging client. The initial ACL applied to a particular messaging client may be an ACL associated with a particular messaging client type as a default, and can then be modified by administrators or other users with suitable authorizations to modify such rules. The ACLs can then be used to customize messaging clients to manage communications within the messaging system.

In further implementations, and based on the information unique to each messaging client connected to the message bus, it is possible to visualize and describe all participants in the messaging system in a semantic way. Particular illustrations of routes between participants can be made available and/or selected using the visualization, and connections between messaging participants can be created. In some instances, connections between messaging clients can be made via drag and drop interactions between clients, or topics of clients.

When connections are attempted to be made in various implementations, a management component can be used to evaluate whether the proposed connection or action is allowed. The management component can obtain the information associated with a particular messaging client (i.e., its corresponding ACL listing) and determine whether a new connection is allowed, whether the connecting client is available to the particular messaging client, or whether the messaging client has participated in more than an allowed amounts of interactions, among others. If it is determined that the connection is allowed, then the management component can allow and create the connection in connection with the virtual message broker. Future messages can be received by an enterprise messaging component and can be directed, as appropriate, via the virtual message broker or message bus, to the corresponding messaging client.

In general, messaging clients may be within a particular tenant in a multi-tenant implementation, such as in a particular subaccount. Additionally, messaging clients may be either cross-tenant components, or they may be reuse components separate from a particular tenant, but have a corresponding client instance for each particular tenant. A reuse component can create a service instance and declares it as a reuse service. Whenever a tenant then subscribes to the reuse component, a client is created in the message bus of the particular tenant for that reuse service.

The proposed solution described herein includes a number of advantages over existing and prior systems. For example, by providing a semantic description of each of the messaging clients, both administrators and authorized users, as well as some non-technical users, can review messaging participants and their messaging status and capabilities, as well as modify particular rules and restrictions specific to individual messaging clients. By providing messaging client-specific technical descriptions, including a unique namespace and rule set, the solution provides the ability for a customizable and configurable messaging scenario, where each messaging client can be considered and managed individually. Another advantage can be realized when a visualization is provided in connection with a well-defined set of messaging client patterns. Using the visualization, a clear picture and illustration of connections is provided. Even without an in-depth visualization, the solution allows users to easily understand and modify defined rules and information associated with particular clients, as well as with particular messages and queues. The solution can further provide governance mechanisms used to ensure that particular messaging clients are used within their defined constraints consistent with any particular rules applied to the use. Similarly, related or similar applications, through messaging client-specific rules, can be managed differently, as needed, allowing a first client of a first type to have the same or different rules and restrictions as a second client of the second type. In doing so, each client, regardless of type, can be configured and managed independently.

FIG. 1 illustrates an example component overview associated with tenant-related artifacts and components and an enterprise message (EM) provider. As illustrated, one or more tenants 102 may be present in a system, with each tenant 102 having one or more messaging clients 104, where each messaging client 104 represents its own message producer or consumer client within the EM system. For example, the messaging clients 104 may include, for example, an enterprise resource planning system (e.g., an SAP S/4 system or instance), a cloud-based application (e.g., an SAP cloud platform (CP) application), or any other external messaging system or component connected to an EM application 122 associated with a provider subaccount 120 of the EM system. As illustrated, an Infrastructure-as-a-Service (IaaS) 140 can be used to provide basic messaging capabilities as a message bus, but can be hidden and abstracted for the tenants.

To onboard messaging clients 104 into the illustrated system, an EM service instance 108 is created and triggered by a particular tenant 102 (e.g., by an authorized user or administrator), providing the messaging client 104 the ability to communicate with the EM application 122 and the abstracted message bus 140. Provisioning for the service instance 108 can be performed a service manager (not shown), which can call the EM service broker implementation 130. In some instances, provisioning of an EM service broker implementation can be done, for example, through an Open Service Broker (OSB) implementation. The OSB API is a well-known standard. The service broker 130 can provide a virtual broker on a message broker 142 on the IaaS layer 140 (e.g., a Solace VPN) if required and not already present, and can create an OAuth client (e.g., via xsuaa, or OAuth client on instance levels). The host tenant 102 can define a set of access rules as shown as ACL 112 for the newly created service instances. The ACLs 112 may be defined as an additional configuration step or as a parameter when triggering the service instance creation. This is different from prior systems, as previously enterprise messaging generally allowed each messaging client 104 to have full access to the message broker without distinction.

Next, the tenant 102 can bind the EM service instance 108 to one messaging client 104, thereby providing a unique identity for the EM service instance 108 and its corresponding messaging client 104. In some instances, the same service instance may be bound to multiple applications. While possible, the standard pattern for the present solution would normally be that each service instance represents one client and the corresponding application to which is bound. Alternative implementations may use single service instances for multiple applications. For future authorizations, the EM service instance 108 is uniquely associated with the messaging client 104. As such, the messaging client 104's particular identity can be known for any future interactions, and the EM application 122 and its operations can enforce any particular restrictions or rules specific to that client 104. Further maintenance and operations associated with the EM service instance 108 may be performed via a dashboard UI 138 or an EM command line interface (CLI) 160, which allows users to manage messaging artifacts, including queues and subscriptions. Actual messaging may be performed between particular applications (e.g., particular messaging clients 104) and the message broker 142 on the Iaas layer via the EM messaging gateway 124 (e.g., using AMQP1.0 or MQTT 3.1.1), which can be performed, for instance, using EM consumer libraries (e.g., Java/Node client) or via the EM REST gateway 126 via HTTP/REST. The EM application 122, as well as other components in the EM layer (e.g., messaging gateway, REST gateway, management layer for queue creation, etc.), apply the ACLs 112 specific to the participating messaging clients 104 and their EM service instance 108. If a messaging client 104 needs to create messaging artifacts (e.g., queues, queue subscription, etc.) on the fly, the hub component 128 (e.g., a management API endpoint) can be called to do so. The corresponding hub component 128 or other suitable API endpoint implementation can then identify and evaluate the ACLs 112 to determine whether the messaging client 104 is allowed or authorized to create the requested artifacts. Rejections to the creation may be based on a particular artifact not being allowed at all (e.g., a queue), or based on a limit on the number of particular artifacts allowed to be created and/or current (e.g., no more than 4 queues).

In some instances, particular messaging clients 104 may also emit events related to their operations, which may allow other components within or external to the tenant 102 to obtain or listen to such events. In some instances, if eventing capabilities are required in addition to basic messaging, the tenant 102 creates another service instance 108 (e.g., including an OAuth Client to ensure unique identity/avoid credentials sharing), and can generate a corresponding service key (e.g., containing the OAuth Client credentials and the messaging endpoints) through the service broker 130 via the cloud controller 150 and/or service manager. The OAuth Client credentials can then be used to authenticate external clients (e.g. S/4 clients in the messaging gateway 124 and REST gateway 126 for exchanging events. The messaging gateway 124 and REST gateway 126 can apply the ACLs 112 and forward the messages to the virtual broker resource of the tenant 102 based on a routing rule. Customer applications can then consume the messages on the virtual broker resource with plain messaging.

Besides the pure runtime perspective of the message/event exchange, the enterprise messaging EM provides capabilities to explore and manage events from the variety of messaging clients 104, such as an S/4 system available to the tenant 102. A hub backend 128 consumes the event catalog metadata 106 which can be provided during the creation of an EM service instance 108 (e.g., by a callback URL to the catalog 106, at a centralized storage location, or as stored within the EM layer). The solution offers a possibility to explore event definitions (e.g., topic structures and payload schemas) which are raised by or available from particular clients 104 (and are listed in event catalog 106). The event definitions can then be used by a developer, user, or administrator to implement custom applications, where those applications subscribe to these events and further process the messages. The actual retrieval of the event definitions may happen in different suitable manners, including based on a pull-based approach which calls a REST endpoint with a well-defined format, or a push-based approach where catalog metadata is pushed from a messaging client 104 to the EM application 122 (via messaging or via a REST endpoint on the EM-side). Based on that, the hub backend 128 can connect to the corresponding event client systems and fetch the event definitions as previously defined and available. Another consumer of the event catalog 106 can be one or more design time tools, such as SAP's WebIDE. In this case, additional considerations regarding the authentication may be made. In some instances, event metadata on the EM application 122 can be cached to deliver a positive user experience in the design time tools. In some instances, a runtime lookup of event definitions can be performed by the messaging clients 104 to generically process events based on their metadata. In such scenarios, a cache may be required to provide appropriate response times.

In some instances, a set of HTTP APIs can be provided by each backend component (e.g., e messaging gateway 124 and REST gateway 126, hub backend 128, and service broker 130, among others) for operations and monitoring. These interfaces may be exclusively used by operation users, and can be consumed via an operations & monitoring UI 132 and backend 134, which provide a central entry point to perform operation tasks and for monitoring. The service broker 130 may also provide a set of REST HTTP APIs for operations and management tasks which are called by an Ops CLI tool 162 (e.g., by platform users with a role of manager of a particular provider account).

Figure 2:
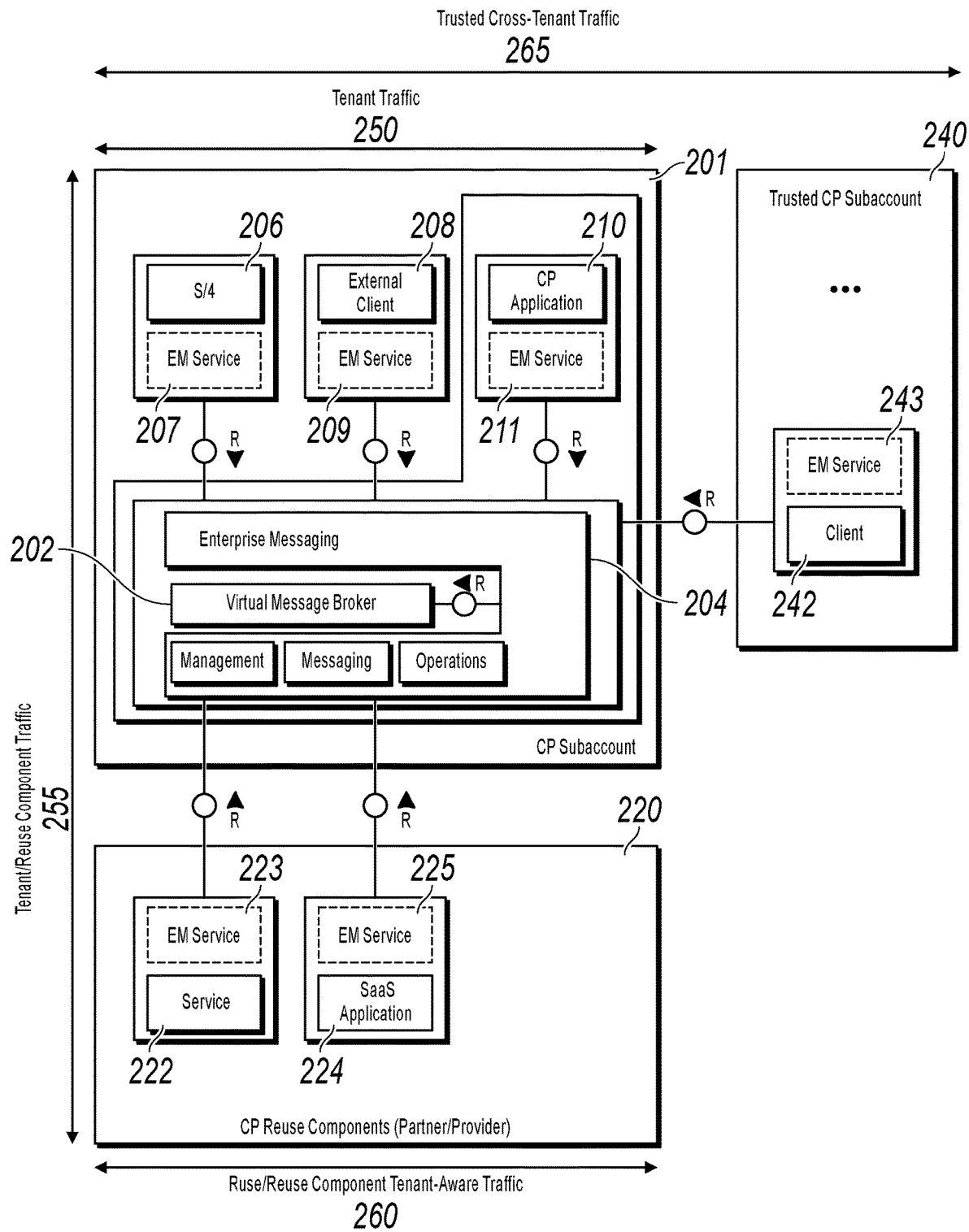
FIG. 2 illustrates a block diagram of components used to control the access of enterprise messaging clients to a virtual message broker.

FIG. 2 illustrates a block diagram of components used to control the access of enterprise messaging clients to a virtual message broker. As illustrated, the virtual message broker 202 acts as the central event and message bus, and is used to exchange messages between the different clients (e.g., 206, 208, and 210) which are connected to the enterprise messaging 204. As the virtual message broker 202 is a shared resource between multiple clients, it needs to be ensured that the various clients are isolated from each other (e.g., without causing any conflicts, exhaustive resource consumption and ensuring the authenticity of messages). Therefore, only the enterprise messaging layer 204 interacts directly with the virtual message broker 202 and its resources, and enforces certain governance aspects for the shared resource. The level of isolation for the virtual message broker 202 is planned on a tenant or subaccount level, which means that every tenant or subaccount has one virtual message broker 202, or message bus, which is used for the message exchange. In some instances, lazy provisioning can be used to make preferred use of such shared resources.

As described in FIG. 1, each messaging client is associated with its own corresponding enterprise messaging service instance. In SaaS scenarios, the client instances exist in each subscribed tenant. For example, the example S/4 client 206 includes EM service 207, while external client 208 includes EM service 209, and the cloud platform application 210 includes EM service 211. Similarly, the reuse service components 220, including service 222 and SaaS application 224, each are respectively associated with EM service 223 and EM service 225. Further, another tenant 240 is associated with a client 242, with the client 242 having its own EM service 243.

Based on the different client types involved in the communication flow, four main communication patterns can be identified: tenant traffic 250, tenant/reuse traffic 255, reuse/reuse tenant-aware traffic 260, and cross-tenant traffic 265. For tenant traffic 250, a tenant-owned external client 208 may want to exchange messages with a tenant-owned cloud platform application 210. For tenant/reuse traffic 255, a tenant 201 may exchange messages with one of a plurality of reuse services or components 220. For reuse/reuse tenant-aware traffic 260, a reuse component can exchange messages with another reuse component in a particular context specific to a particular tenant. For cross-tenant traffic 265, another tenant 240 may exchange messages with the tenant 201.

In FIG. 2, the cloud platform application 210 can be deployed in a subaccount of a particular tenant 201. Cloud platform applications 210 in a dedicated tenant subaccount 201 have a binding to a dedicated EM service instance 211, which references a virtual instance of the tenant and exchanges messages.

The external client 208 is an application managed by the tenant 201, and may be applications in a specific tenant context outside of the cloud platform (e.g., S/4, or other arbitrary clients). The external clients 208 can have a binding or service key to a dedicated EM service instance 209, which references the virtual instance of the tenant 201 and exchanges messages via the enterprise messing 204.

The reuse components 220 (e.g., service 222 and SaaS application 224) can each respectively have their own binding to dedicated EM service instance 223, 224, in the provider subaccount, and can declare that service as a dependent service. During subscription time, a subscription is created for the tenant 201 (e.g., including the credentials of the services to the tenant subaccount), which is required for a trust configuration and approval of the tenant 201 which has just subscribed. The respective reuse component 220 is then responsible for establishing tenant-specific connections (e.g., based on OAuth tokens in the tenant's subdomains) for each subscribed or connected tenant.

A trusted subaccount 240 may be used where a trusted party wants to exchange messages with a certain tenant (e.g., tenant 201), or when a particular tenant 201 wants to exchange messages with a different tenant. A subscription process can be performed by the tenant 201 to allow the trusted subaccount 240 of the other tenant to do messaging with the tenant's (201) enterprise messaging application 204 and underlying virtual message broker 202.

Figure 3:
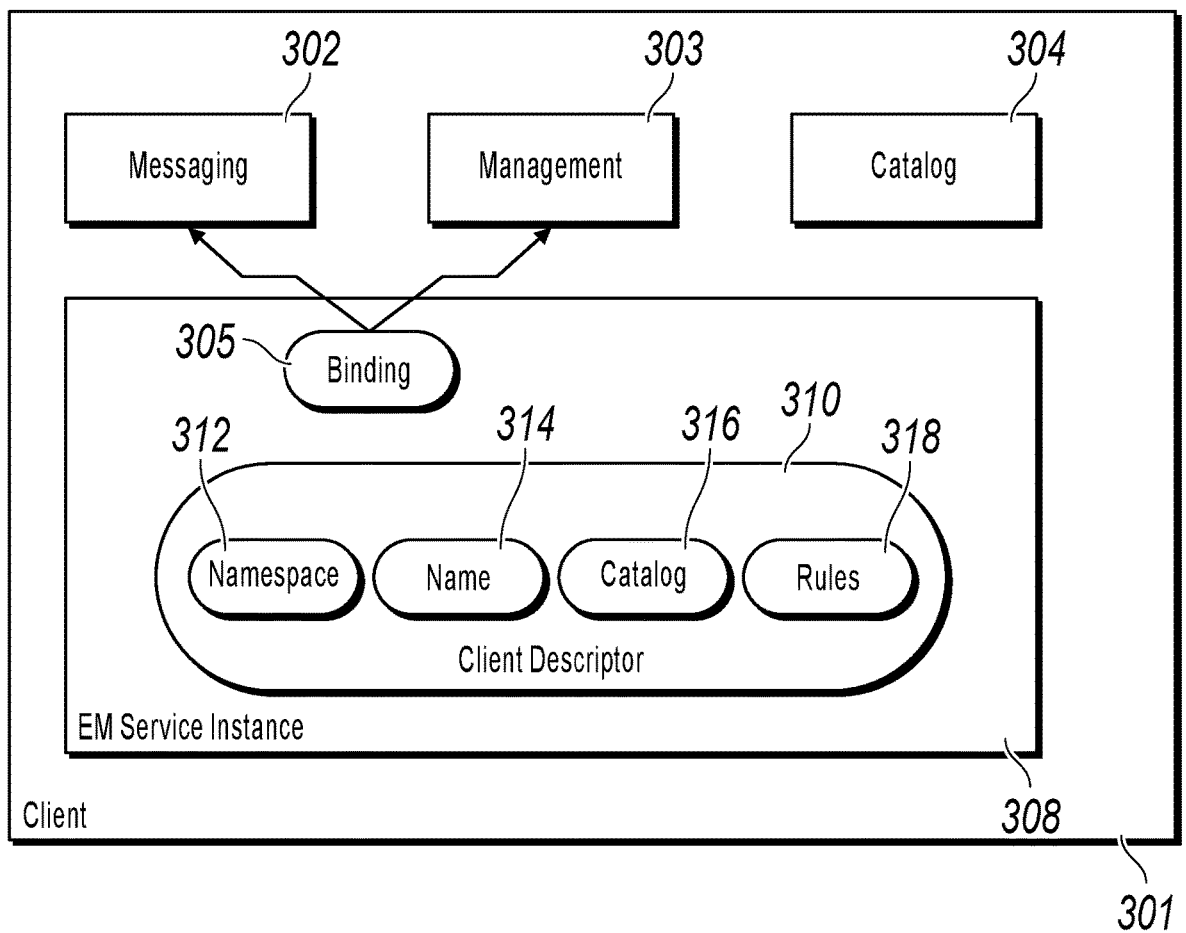
FIG. 3 represents a block diagram illustrating an example enterprise messaging client.

FIG. 3 represents a block diagram illustrating an example enterprise messaging client, such as messaging client 104 of FIG. 1. Other implementations or modifications may be made, and FIG. 3 represents an example client 301.

Each client 301 can include a messaging client 302, a management client 303, and a catalog 304. The messaging client 302 can represent a messaging component or library (e.g., AMPQ 1.0/MQTT 3.1.1/HTTP REST client, etc.) to exchange messages with the message bus, or the virtual message broker (e.g., virtual message broker 202). Endpoints and credentials for communication can be provided in binding 305.

The client 301 can use the management client 303 to manage queues and queue subscriptions in its own namespace. The endpoints/credentials are provided in the binding 305.

The client 301 can include catalog 304, where catalog 304 exposes the messaging client's event definitions in a well-defined format. In one implementation, the catalog 304 can expose the event definitions in an AsyncAPI format, where other messaging participants can easily view the types of events that can be subscribed to for that particular client 301. The AsyncAPI definition can define what is subscribed to by the client, with the whole of inbound and outbound traffic being considered. In some instances, such as the visualization of FIG. 5, the types of events available in a particular client's catalog 304 can be presented and shown to users for potential connections.

Each enterprise messaging client 302 is described by a client/service descriptor 310 (client descriptor 310), which contains a set of properties defining the client 301 and its corresponding service instance 308. The client descriptor 310 can be in a well-defined format, such as JSON, and can contain the following properties. First, a client namespace 312 can be a unique technical name within the message bus (e.g., on a tenant and/or subaccount level). A name 314 can be a unique client name within the message bus (e.g., on a tenant and/or subaccount level). A link or pointer to a destination which contains the link to a catalog 316, or a set of potential events emitted by the client 301, can be provided. When onboarding the client 301, the catalog 316 can be made available via connections or links to the catalog 316, or by transmitting or otherwise providing the contents of the catalog 316 to a centralized location, such as the enterprise messaging application 204 or a linked memory or storage. In some instances, the client descriptor 310 may include information or definitions of one or more options, which control whether the client 301 is allowed to use messaging management APIs, messaging via HTTP REST, and/or messaging via particular messaging protocols (e.g., AMQP 1.0/MQTT 3.1.1, or others). A set of rules 318, similar to the ACLs 112 described in FIG. 1, can be associated with each client 301 and defined in the client (or service) descriptor 310. The rules 318 can be used to manage the particular operations and capabilities of the client 301. In some instances, the rules 318 may be associated with a default set of values based on the type of underlying application or type of client 301. Users may modify the particular rules 318 prior to the first execution of the service instance 308 and client 301, or after the client 301 has been onboarded into a particular messaging system. In those instances, the additional rule modifications may be reflected in the rules 318, or may exist as a further configuration on top of the underlying rules 318 as processed at runtime. In some instances, the rules 318 can provide or otherwise define resource limits and/or allowed resource consumption (e.g., a maximum amount of queues, a maximum amount of connections, etc.) for the client 301. The rules may also be subject matter specific, and can include rules related to particular topics for publishing and/or for subscribing. For example, the rules 318 may define particular ways or types of subject matter that can be published, including how such topics can be published, such as through simplified wildcard support (e.g., starting with the client's namespace). The rules 318 may also identify the allowed topics for subscribing, including a simplified wildcard support that may be required for communication with other clients, including rules to consider for interacting with foreign namespaces. Still further, the rules 318 may define how the client 301 may interact with or otherwise use queues, including information related to whether the client 301 is allowed message read access queues, or which message queues read access is allowed, as well as which queues the client 301 is allowed to have write access.

Figure 4A:
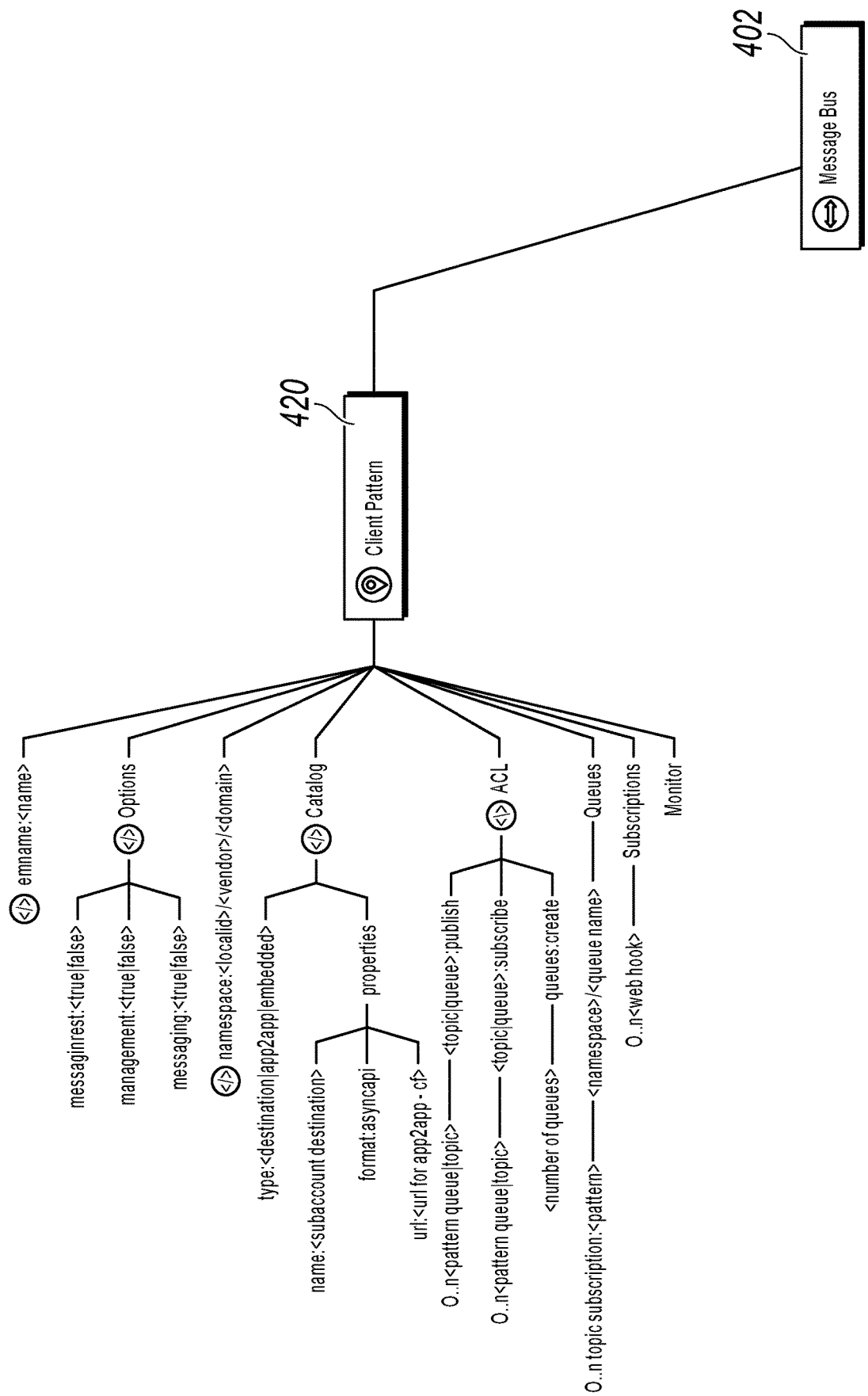
FIG. 4 represents an example mind map illustrating a visualization of a plurality of messaging clients within a particular implementation.
Figure 4C:
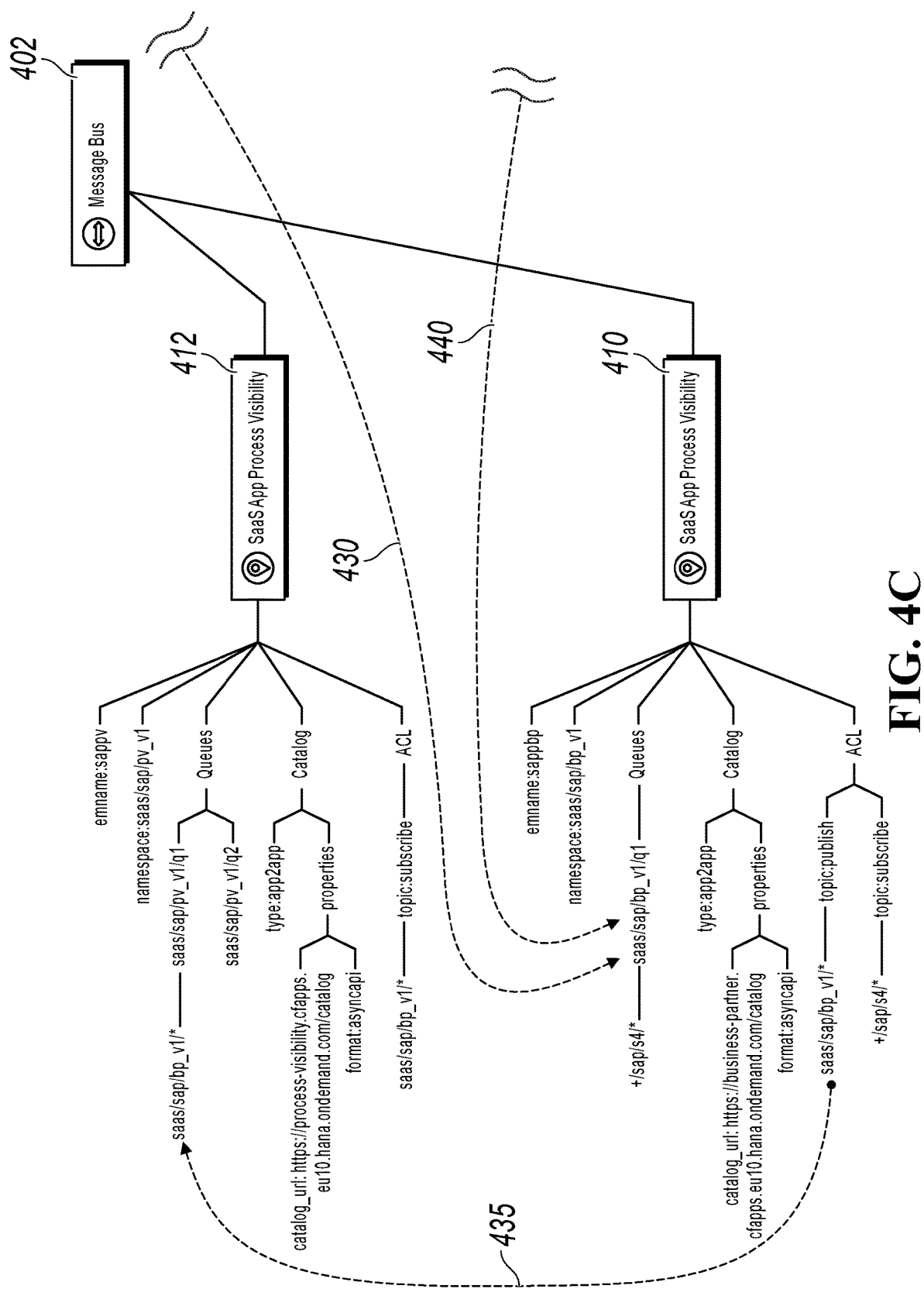
Figure 4D:
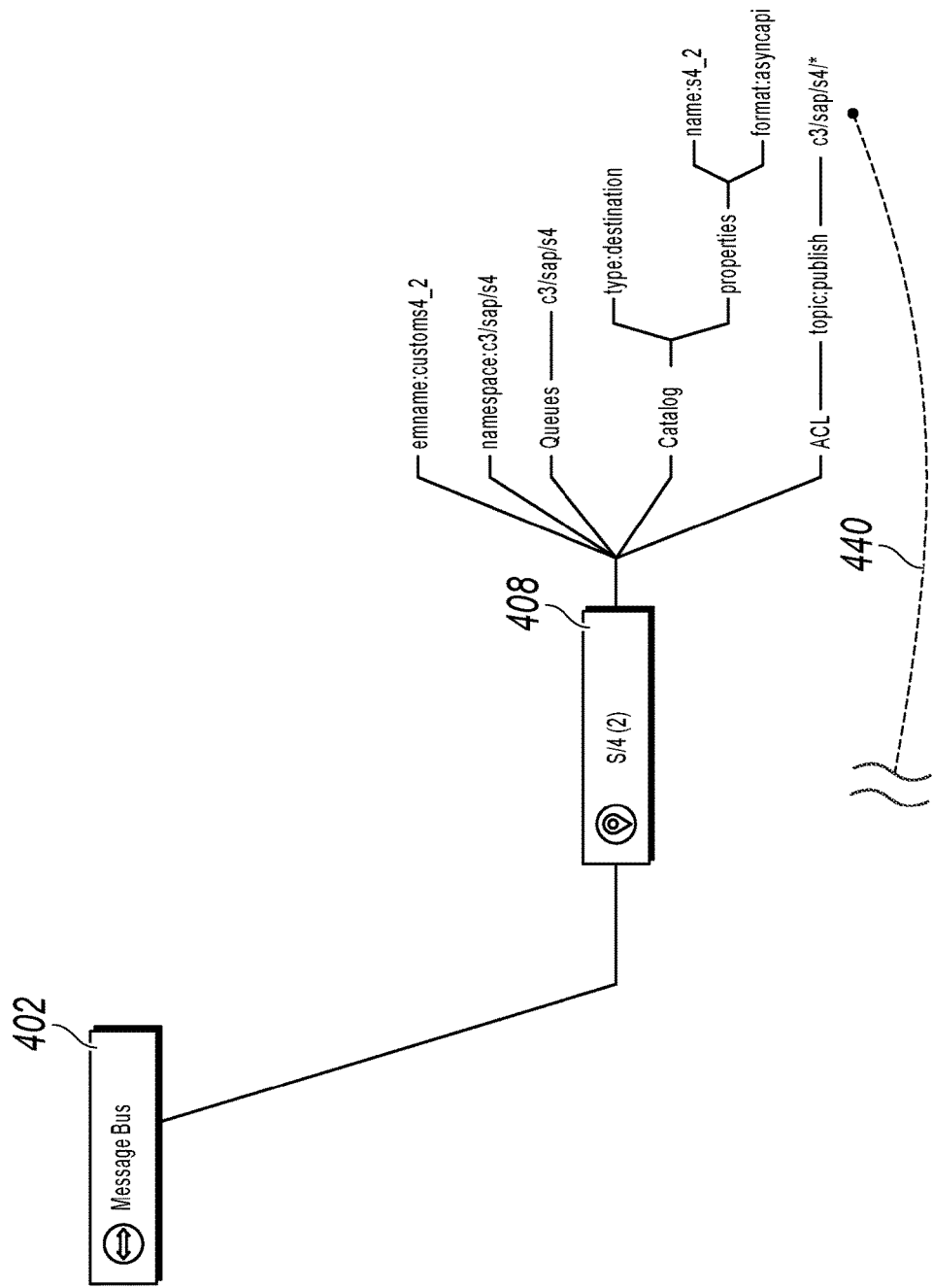

FIG. 4 represents an example mind map illustrating a visualization of a plurality of messaging clients within a particular implementation. As illustrated, message bus 402 (e.g., virtual message broker) can be connected to a plurality of components via enterprise messaging. As illustrated, the example messaging bus 402 is associated with 5 components, a cloud foundry application 404, a first S/4 application 406, a second S/4 application 408, a reuse service 410, and a SaaS app process visibility application 412. As previously described, during onboarding, each of these applications are provisioned their own enterprise messaging service instance for interacting with the message bus 402, and allowing messaging with other connected systems. As illustrated, each of the components is associated with a human-readable name (e.g., "customapp" for CF app 402), a namespace (e.g. "c1/z/customapp" for CF app 402), a set of rules (as shown by the corresponding ACLs), a catalog, and one or more associated queues, where appropriate. By providing the unique namespaces and other metadata, each component illustrated in the mind map 400 can be uniquely identified and managed, unlike prior solutions. For example, two S/4 instances (406 and 408) are associated with the message bus 402. Based on their specific namespaces, names, and rules, the two S/4 instances 406, 408 can be associated with different definitions and configurations. Each of the instances 406, 408 can be associated with their own credentials, and can therefore be uniquely registered and available to perform their own operations and configurations in the ongoing messaging operations herein.

Because each component has an individual and unique identity, the system herein can implement fine granular access control. For example, a user may view the mind map 400, and can identify or connect particular topics of one component to be consumed or subscribed to by another component. As illustrated, for example, arrow 430 illustrates a published topic "c2/sap/s4/*" from the first S/4 component 406 being selected for subscription by a queue associated with the reuse service 410. Using any suitable selection, including a drag and drop interaction via the UI, a user can initiate or otherwise indicate that such a selection is being made. Using the selection, the set of rules specific to each participant in the proposed messaging can be considered by the message bus 402 to determine whether the messaging is allowed by both components. For example, the published topic may be associated with a rule allowing only two other components to consume the messages published under that topic. If two or more components have already subscribed or connected to that topic from S/4 component 406, then the connection may be declined or rejected. Further, the reuse service 410 may only be allowed to generate three queues. If three queues have already been established by the reuse service 410, then the connection may be rejected. If both rule sets, upon evaluation, allow the connection, then the messaging interaction can be allowed, and the message bus 402 can allow such communications to occur. Other illustrated connections can be shown in the mind map, including connections 435, 440, 445, and 450, each connecting particular published topics to other components for messaging. In some instances, queues associated with particular components may be on behalf of that component such that the queues are stored at a centralized location and populated as messages or events are generated. When those components return to connectivity and can access the queues, the associated messages can be obtained and delivered to the component for consumption.

The illustrated client pattern 420 provides an illustration of the organization of the JSON or other well-defined structure of a particular client added to the messaging scenario. As illustrated, each client is associated with a name and a namespace, each uniquely defining the messaging client. In some instances, one or more options can be defined. A catalog type and the information needed to access and/or obtain the catalog is provided. The type of catalog acquisition, either push- or pull-based, may be defined within the definition as well. Further, the ACL can define the rules and restrictions upon the client. A set of queues associated with the client may be provided, as well as subscriptions. As illustrated in the other components 404, 406, 408, 410, and 412, some of the entries are optional and may not need to be included in each and every component.

As described herein, each message consumer or recipient component can define how messages are consumed, and how many times. Message consumers thus can manage one or more queues associated with their consumed information, along with subscriptions to particular published topics by other components.

Returning to FIG. 2, the enterprise messaging layer 204 is responsible for ensuring certain governance aspects previously mentioned, which includes the management component 214. The operations performed by the enterprise messaging layer 204 include provisioning, operations/management, catalog discovery, and client scoping.

Figure 5:
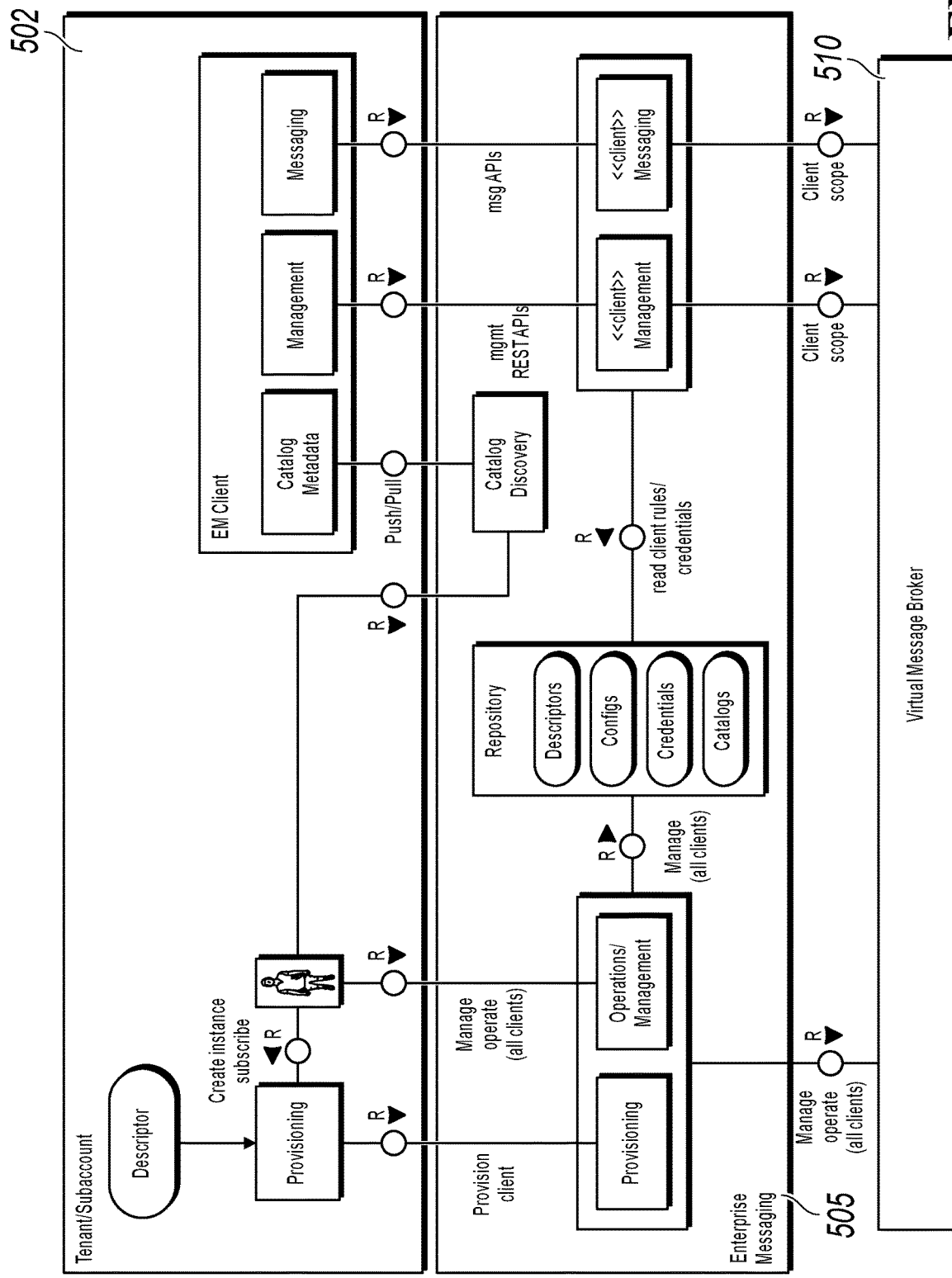
FIG. 5 illustrates a block diagram illustrating an example logical diagram of an enterprise messaging system in one implementation.

As illustrated in FIG. 5, the enterprise messaging layer 505 (similar to enterprise messaging layer 204) separates the various tenants 502 and their components from the virtual message broker 510.

With regard to provisioning, the enterprise messaging layer 505 may include a provisioning component or functionality which can be responsible for provisioning or de-provisioning messaging clients to the underlying message bus. The enterprise messaging layer 505 can implement, for example, an Open Service Broker API for providing service instances, and can receive Subscribe/Unsubscribe callbacks for reuse components. Both operations can act as triggers for lazy initialization of the message bus. By doing so, and providing individual service instances for each messaging client, the enterprise messaging layer 505 can ensure that valid service descriptors are associated with each service instance (and therefore each messaging client), that each service instance is provided and associated with a unique client namespace and name, and that valid catalog information is associated with the messaging client to allow other components to subscribe and/or review the available events associated with the component.

The operations and management component (similar to 216 of FIG. 2) of the enterprise messaging layer 505 is a central entry point for managing all management clients (e.g., 303 of FIG. 3) which are connected to the virtual message broker 510. The management component can provide a holistic view to the message bus or virtual broker 510 of all messaging participants. The management component can overwrite the rules (or ACLs) provided in a particular messaging client's service descriptor to grant messaging clients more privileges or to remove some previously allowed privileges. The rules themselves may be modified, or a configuration may be generated that is applied and evaluated at runtime. The management component can have full access to the metadata of all clients, including the particular messaging configuration defined during interactions between messaging clients, including, but not limited to, particular queues and queue subscriptions, among others. This information can be stored at a centralized location, and can be used to resolve and/or visualize all message routes between messaging clients which are connected to the message bus via enterprise messaging.

Catalog discovery can be provided by the enterprise messaging layer 505 using an event metadata discovery API that allows the system to visualize all event catalogs provided by messaging clients upon onboarding and provisioning. The event catalogs can be pull- or push-based from particular messaging clients, or may be stored directly in an enterprise messaging catalog repository.

The solution illustrated in FIG. 5 provides client-scoped management, in that the enterprise messaging layer 505 provides a client-scoped REST API for queue and queue subscription management. This management allows messaging clients to create configuration changes (e.g., queues and queue subscriptions) on the fly at runtime. When particular changes are attempted, the enterprise messaging layer 505 can perform governance operations to ensure that the proposed configurations and changes follow rules defined for each participant in a messaging operation (e.g., as provided in the corresponding client descriptors, ACLs, or dynamically-modified rule configurations), as well as overall governance requirements (e.g., queues must start and be associated with a particular namespace). If any of those rules or requirements are violated, such connections and messaging is rejected.

Additionally, the enterprise messaging layer 505 provides messaging endpoints for exchanging messages via the virtual message broker 510. The messaging components can act as a proxy to the actual message broker, and can therefore capture additional statistics and information associated with the different messaging clients. For example, those statistics and information can be used for metering and monetization, such as in a Pay-Per-Use model. As traffic is clearly assignable to certain clients, such tracking is made possible—previous message brokers were unable to distinguish between clients and were unable to track such usage.

Figure 6:
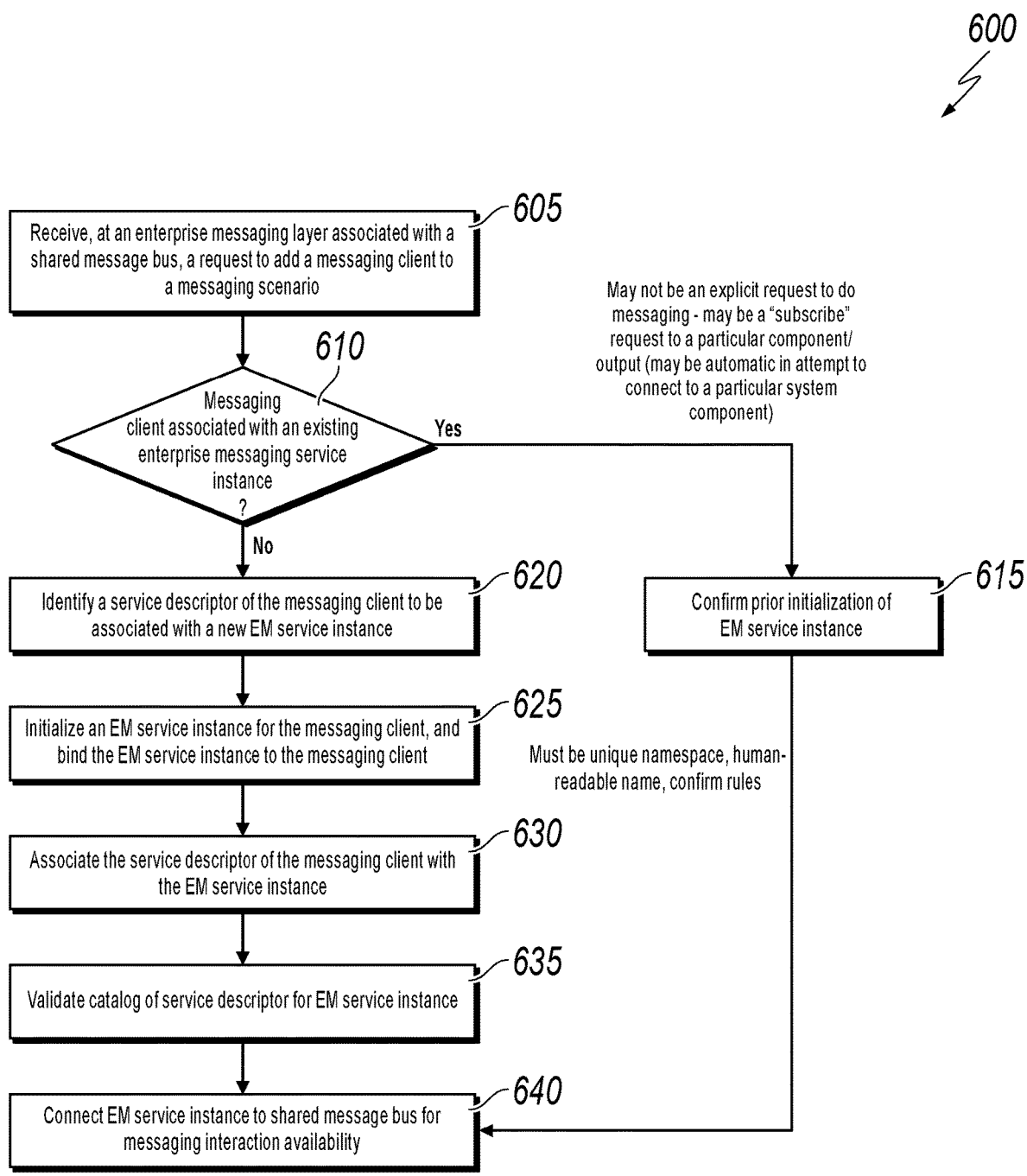
FIG. 6 is a flowchart illustrating an example onboarding process in the provided enterprise messaging solution for a particular messaging client in one implementation.

FIG. 6 is a flowchart illustrating an example onboarding process in the provided enterprise messaging solution for a particular component. FIG. 6 may be performed in any suitable system, including in one of those systems already described herein. The process 600 provided may be modified to include additional, fewer, and/or alternative operations, and is meant to be an example illustration of a potential process.

At 605, a request to add a messaging client to a messaging scenario is received at an enterprise messaging layer associated with a shared message bus or message broker. The enterprise messaging layer can be used to abstract or remove the shared message bus from direct connections to various messaging clients and components. The request may be an explicit request to add a particular messaging client to the messaging scenario, while in other instances, the request may be inferred and acted upon based on particular interactions. In those instances, the user or system performing those particular interactions may not be aware of the enterprise messaging layer and/or its requirements, and may instead be performing an action associated with enterprise messaging that is not an explicit attempt to join the messaging scenario. In some instances, that may include an attempt to subscribe to a certain feed or output from another messaging client (e.g., by clicking "subscribe" to a feed or event source in a system capable of enterprise messaging via a shared message bus or broker). The subscription may be to the messaging client itself, or to a particular topic or published set of information associated with that messaging client, including where the messaging client itself is hidden or otherwise not readily apparent to the user or system performing the action. In some instances, interactions may be received via a visualization of a message scenario similar to that illustrated in FIG. 4, where a particular topic is selected by a user.

At 610, a determination is made as to whether the messaging client to be added to the messaging scenario is associated with an existing enterprise messaging (EM) service instance. In other words, a determination is made as to whether the messaging client has already been added to the messaging scenario by the enterprise messaging layer. If so, method 600 continues at 615, where the prior initialization of the EM service instance of the messaging client is confirmed. Once confirmed with the enterprise messaging layer, method 600 continues to 640.

If, however, the messaging client is not associated with an existing EM service instance, method 600 continues at 620. At 620, a service descriptor of the messaging client to be associated with a new EM service instance is identified. The service descriptor can be used to uniquely define the messaging client within the enterprise messaging scenario. In addition, the service descriptor can provide information to other messaging participants and clients about the information potentially available from or associated with the messaging client, based on the messaging client's identified catalog. In particular, the messaging client and its service descriptor should define a unique namespace for the messaging client, as well as a unique human-readable name that can be presented to users of the other messaging clients to identify the component. The service descriptor can include or define a set of rules associated with the allowed capabilities of the messaging client, including a number of connections that are allowed to be made, the types of connections available, and various other information that defines the allowed interactions and operations that can be performed by the particular messaging client.

At 625, an EM service instance is initialized for the messaging client, and can bind the instantiated EM service instance to the particular messaging client. In doing so, each messaging client is associated with a single service instance that communicates with the enterprise messaging layer. In some instances, the service descriptor may be identified after the new EM service instance is initialized. In either instance, the service descriptor of the messaging client is associated with the initialized EM service instance at 630 (if not already performed, for instance, at 625).

At 635, the enterprise messaging layer can validate a catalog identified in the service descriptor for the EM service instance. Validating the catalog may include confirming the catalog is in a proper format and corresponds to a set of valid information. The catalog can identify a particular location at which events associated with the messaging client are listed and identifiable within the enterprise messaging scenario. In some instances, the enterprise messaging layer may access and store the listing of the catalog, while in other instances, the location (e.g., a URL) associated with the catalog may be accessible for analysis and exploration. Once onboarded and validated, the catalog may be used by other messaging clients in the scenario to review and subscribe to particular topics or events emitted by the messaging client.

At 640, the EM service instance is connected (or considered connected) to the shared message bus for messaging interaction availability. In some instances, the messaging client and its EM service instance may be visualized within a mind map of the messaging scenario, such as one of the components illustrated in FIG. 4. Where appropriate, the specific information about the messaging client and the EM service instance can then be made available for other messaging clients to review, as well as external systems. Connections, via any suitable method, can then be formed with or via the EM service instance to allow communications to be routed between messaging clients via the backend shared message bus.

Figure 7:
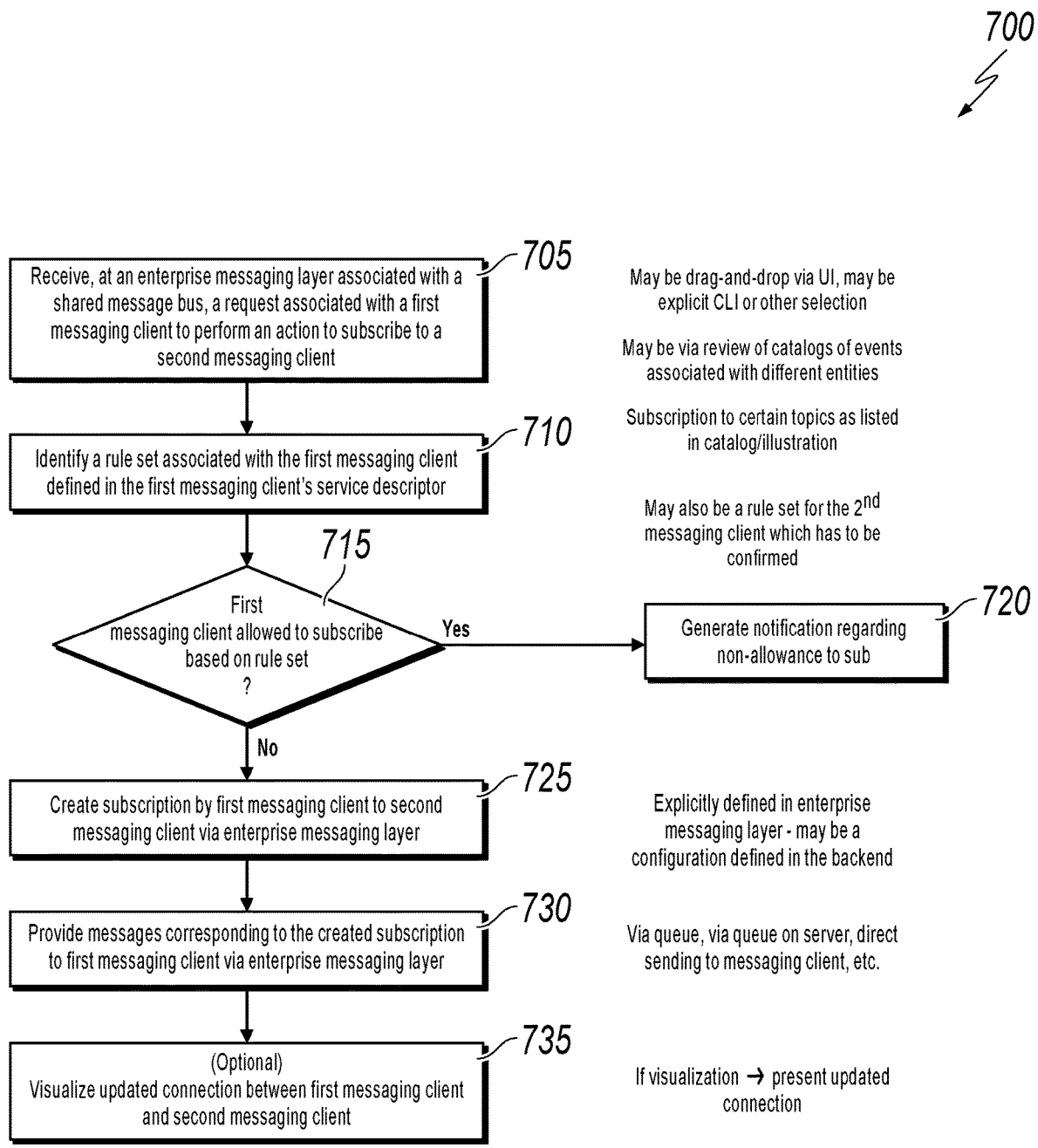
FIG. 7 is a flowchart illustrating an example process for connecting two messaging clients in an example enterprise messaging implementation.

FIG. 7 is a flowchart illustrating an example process for connecting two messaging clients (i.e., a first messaging client and a second messaging client) in the provided enterprise messaging solution. In some instances, the first messaging client may be a recently added component, such as one added via the operations of method 600. In other instances, the first and second messaging clients may be messaging clients previously onboarded into a messaging scenario, and for whom additional changes and interactions are desired. The first and second messaging clients, as described, are associated with their own respective EM service instances, which are used to connect to those respective messaging clients to the enterprise messaging layer. In some instances, one of the messaging clients, in response to an attempted connection or subscription, may be onboarded to the messaging scenario as described in FIG. 6.

At 705, a request associated with a first messaging client may be received to perform an action to subscribe or otherwise connect to a second messaging client at an enterprise messaging layer associated with a shared message bus. In some instances, the request may be triggered via drag-and-drop connections via a mind map visualization (e.g., as shown in FIG. 4), as well as through any other suitable UI interaction via the visualization. In other instances, the request may be triggered through a command line interface interaction, as well as any other suitable interaction. The request may be a request to subscribe to or connect with events emitted by the second messaging client, and may be limited to a particular discrete topic, or to one or more events associated with the unique namespace of the second messaging client in addition to a wildcard value, which may allow for various topics from the second messaging client to be obtained.

At 710, a rule set associated with the first messaging client as defined in the service descriptor of the first messaging client is identified. The rule set may be defined or associated with the first messaging client at onboarding, or may be modified after onboarding by a suitable administrator or user having suitable authorization. The rule set may be modified by a configuration file or additional configuration information applied at runtime, or the rule set associated with the messaging client may be directly modified in the service descriptor or information reflecting the service descriptor of the messaging client.

At 715, the enterprise messaging layer can perform a governance operation to determine whether the first messaging client is allowed to subscribe to the second messaging client based on the identified rule set. The determination can use the defined rule set to determine whether the first messaging client is allowed to subscribe to the particular second messaging client, whether the first messaging client has exceeded a maximum number of connections to other messaging clients, whether any of the defined rules in the rule set are violated, or if the subscription or connection is within the allowed parameters. As illustrated here, only the rule set of the first messaging client attempting to subscribe or connect to the second messaging client are described. However, in some instances, the rule set of the second messaging client may be identified at 710 and evaluated at 715 in light of the request, and can assist in the decision of whether or not the connection will be allowed.

If, after the determination of 715, the first messaging client is not allowed to subscribe to the second messaging client, method 700 can move to 720 where the connection is refused and/or rejected. At 720, a notification can be generated as to the non-allowance of the subscription. In some instances, a reason associated with the rejection may be provided in the notification. After 720, method 700 can end until a new request is received.

If, after the determination of 715, the first messaging client is determined to be allowed to subscribe to the second messaging client, method 700 can move to 725. At 725, the requested subscription by the first messaging client to the second messaging client via the enterprise messaging layer can be created, thereby allowing the first messaging client to obtain or receive any events or messages emitted from or generated by the corresponding subscribed topics published by the second messaging client as they are generated at 730. In some instances, the events or messages can be provided to the first messaging client directly when new messages are generated or published via the shared message bus. In other instances, the events or messages can be provided to a queue or other location associated with the first messaging client, and can then be accessed or downloaded by the first messaging client when suitable, such as when the first messaging client returns to an online connection or status, or in response to a manual trigger to download a stored queue of subscribed messages.

In some instances, at 735, the updated connection between the first and second messaging clients can be illustrated in a visualization of the messaging scenario, such as in the illustrated mind map of FIG. 400. For example, an arrow similar to arrows 430, 435, 440, 445, and 450 may be added to a visualization or other indication of connections between components (e.g., service instances or messaging clients) as provided in the mind map, allowing administrators and other authorized users to easily view and understand connections between messaging clients.

The preceding figures and accompanying description illustrate example processes and computer-implementable techniques. The described systems, their software, and their components contemplate using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   receiving, at an enterprise messaging layer associated with a shared message bus, a request associated with a first messaging client to subscribe to a second messaging client, wherein the enterprise messaging layer provides an abstraction to the shared message bus, and wherein the shared message bus is shared between the first messaging client and the second messaging client;
   identifying a first rule set associated with the first messaging client and a second rule set associated with the second messaging client, the first rule set defined in a first service descriptor associated with a first enterprise messaging service instance bound to the first messaging client, and the second rule set defined in a second service descriptor associated with a second enterprise messaging service instance bound to the second messaging client, wherein the first rule set includes at least one rule defining a number of resources allowed for the first messaging client and the second rule set includes at least one rule defining a number of resources allowed for the second messaging client, wherein the first rule set is different than the second rule set, wherein the first rule set associated with the first messaging client is defined at onboarding of the first messaging client to the enterprise messaging layer, and wherein the first rule set further defines at least one rule defining whether the first messaging client is allowed to subscribe to topics associated with other messaging clients of the enterprise messaging layer, wherein the at least one rule defining the number of resources allowed for the first messaging client comprises at least one rule defining a maximum number of queues for receiving messages or events from the other messaging clients of the enterprise messaging layer; and
   in response to determining that the requested subscription to the second messaging client is allowed by the first rule set and the second rule set:
      creating the requested subscription from the first messaging client to the second messaging client via the enterprise messaging layer; and
      in response to an event corresponding to the created subscription being generated by the second messaging client, providing the generated event to the first messaging client for consumption.

2. The computer-implemented method of claim 1, wherein the
   at least one rule defining the number of resources allowed for the first messaging client further comprises at least one of the following:
      at least one rule defining which queues of a number of queues the first messaging client is allowed to have read access;
      at least one rule defining which queues of a number of queues the first messaging client is allowed to have write access; or
      at least one rule defining a number of connections allowed to be created for the first messaging client to other messaging clients of the enterprise messaging layer.

3. The computer-implemented method of claim 2, wherein the first rule set of the first messaging client is customization after onboarding of the first messaging client.

4. The computer-implemented method of claim 1, wherein, in response to determining that the requested subscription to the second messaging client is not allowed by the first rule set, the method comprises rejecting the requested subscription to the second messaging client.

5. The computer-implemented method of claim 1, wherein the first messaging client and the second messaging client, when onboarded to the enterprise messaging layer, are associated with a respective unique namespace, unique human-readable name, a rule set for a messaging client, and a catalog defining a set of messages or events published by the messaging client.

6. The computer-implemented method of claim 5, wherein, after onboarding to the enterprise messaging layer, a visualization of the first messaging client and the second messaging client to the shared message bus is generated.

7. The computer-implemented method of claim 6, further comprising:
presenting the generated visualization of the first messaging client and the second messaging client to a user interface, and wherein the received request for the first messaging client to subscribe to a second messaging client is received via user interface interactions between the visualized first messaging client and the second messaging client as received via the presented visualization.

8. The computer-implemented method of claim 6, wherein the generated visualization includes at least a third messaging client previously onboarded to the enterprise messaging layer.

9. A non-transitory, computer-readable medium storing computer-readable instructions which, when executed by a computer, cause the computer to:
receive, at an enterprise messaging layer associated with a shared message bus, a request associated with a first messaging client to subscribe to a second messaging client, wherein the enterprise messaging layer provides an abstraction to the shared message bus, and wherein the shared message bus is shared between the first messaging client and the second messaging client;
identify a first rule set associated with the first messaging client and a second rule set associated with the second messaging client, the first rule set defined in a first service descriptor associated with a first enterprise messaging service instance bound to the first messaging client, and the second rule set defined in a second service descriptor associated with a second enterprise messaging service instance bound to the second messaging client, wherein the first rule set includes at least one rule defining a number of resources allowed for the first messaging client and the second rule set includes at least one rule defining a number of resources allowed for the second messaging client, wherein the first rule set is different than the second rule set, wherein the first rule set associated with the first messaging client is defined at onboarding of the first messaging client to the enterprise messaging layer, and wherein the first rule set further defines at least one rule defining whether the first messaging client is allowed to subscribe to topics associated with other messaging clients of the enterprise messaging layer, wherein the at least one rule defining the number of resources allowed for the first messaging client comprises at least one rule defining a maximum number of queues for receiving messages or events from the other messaging clients of the enterprise messaging layer; and
in response to determining that the requested subscription to the second messaging client is allowed by the first rule set and the second rule set:
create the requested subscription from the first messaging client to the second messaging client via the enterprise messaging layer; and
in response to an event corresponding to the created subscription being generated by the second messaging client, provide the generated event to the first messaging client for consumption.

10. The computer-readable medium of claim 9, wherein the
at least one rule defining the number of resources allowed for the first messaging client further comprises at least one of the following:
at least one rule defining which queues of a number of queues the first messaging client is allowed to have read access;
at least one rule defining which queues of a number of queues the first messaging client is allowed to have write access; or
at least one rule defining a number of connections allowed to be created for the first messaging client to other messaging clients of the enterprise messaging layer.

11. The computer-readable medium of claim 10, wherein the first rule set of the first messaging client is customization after onboarding of the first messaging client.

12. The computer-readable medium of claim 9, wherein the computer-readable instructions further cause the computer to:
in response to determining that the requested subscription to the second messaging client is not allowed by the first rule set, reject the requested subscription to the second messaging client.

13. The computer-readable medium of claim 9, wherein the first messaging client and the second messaging client, when onboarded to the enterprise messaging layer, are associated with a respective unique namespace, unique human-readable name, a rule set for a messaging client, and a catalog defining a set of messages or events published by the messaging client.

14. The computer-readable medium of claim 13, wherein, after onboarding to the enterprise messaging layer, a visualization of the first messaging client and the second messaging client to the shared message bus is generated.

15. The computer-readable medium of claim 14, wherein the computer-readable instructions further cause the computer to:
present the generated visualization of the first messaging client and the second messaging client to a user interface, and wherein the received request for the first messaging client to subscribe to a second messaging client is received via user interface interactions between the visualized first messaging client and the second messaging client as received via the presented visualization.

16. The computer-readable medium of claim 14, wherein the generated visualization includes at least a third messaging client previously onboarded to the enterprise messaging layer.

17. A system comprising:
one or more computers; and
a computer-readable medium coupled to the one or more computers having instructions stored thereon which, when executed by the one or more computers, cause the one or more computers to perform operations comprising:
receiving, at an enterprise messaging layer associated with a shared message bus, a request associated with a first messaging client to subscribe to a second messaging client, wherein the enterprise messaging layer provides an abstraction to the shared message bus, and wherein the shared message bus is shared between the first messaging client and the second messaging client;
identifying a first rule set associated with the first messaging client and a second rule set associated with the second messaging client, the first rule set defined in a first service descriptor associated with a first enterprise messaging service instance bound to the first messaging client, and the second rule set defined in a second service descriptor associated with a second enterprise messaging service instance bound to the second messaging client, wherein the first rule set includes at least one rule defining a number of resources allowed for the first messaging client and the second rule set includes at least one rule defining a number of resources allowed for the second messaging client, wherein the first rule set is different than the second rule set, wherein the first rule set associated with the first messaging client is defined at onboarding of the first messaging client to the enterprise messaging layer, and wherein the first rule set further defines at least one rule defining whether the first messaging client is allowed to subscribe to topics associated with other messaging clients of the enterprise messaging layer, wherein the at least one rule defining the number of resources allowed for the first messaging client comprises at least one rule defining a maximum number of queues for receiving messages or events from the other messaging clients of the enterprise messaging layer; and in response to determining that the requested subscription to the second messaging client is allowed by the first rule set and the second rule set:

creating the requested subscription from the first messaging client to the second messaging client via the enterprise messaging layer; and in response to an event corresponding to the created subscription being generated by the second messaging client, providing the generated event to the first messaging client for consumption.

18. The system of claim 17, wherein the
at least one rule defining the number of resources allowed for the first messaging client further comprises at least one of the following:

at least one rule defining which queues of a number of queues the first messaging client is allowed to have read access;

at least one rule defining which queues of a number of queues the first messaging client is allowed to have write access; or at least one rule defining a number of connections allowed to be created for the first messaging client to other messaging clients of the enterprise messaging layer.

19. The system of claim 18, wherein the first rule set of the first messaging client is customization after onboarding of the first messaging client.

20. The system of claim 17, wherein the instructions further cause the one or more computers to perform operations comprising:

in response to determining that the requested subscription to the second messaging client is not allowed by the first rule set, rejecting the requested subscription to the second messaging client.

* * * * *